Aug. 16, 1927.

R. C. ZANNOTH 1,639,446

ATTACHING MEANS FOR COMBINATION FAUCETS

Filed Jan. 31 1927

INVENTOR.
ROBERT C. ZANNOTH
BY
ATTORNEY.

Patented Aug. 16, 1927.

1,639,446

UNITED STATES PATENT OFFICE.

ROBERT C. ZANNOTH, OF MILWAUKEE, WISCONSIN, ASSIGNOR TO THE ROBERTS BRASS COMPANY, OF MILWAUKEE, WISCONSIN, A CORPORATION OF WISCONSIN.

ATTACHING MEANS FOR COMBINATION FAUCETS.

Application filed January 31, 1927. Serial No. 164,762.

This invention relates to means for attaching plumbing fixtures of the type commonly known to the trade as combination faucets in which a single discharge spout is in communication with both hot and cold water supply pipes.

The advantages of these combination faucets are numerous as shown by their almost universal use; however the problem of their installation is a serious one due to the unstandardized spacing between the supply pipes. A standard spacing of eight inches has been adopted between the inlet ports of the combination faucet; however the inability to similarly standardize the spacing between the supply pipes has caused the trade no small inconvenience as a combination faucet with the standard spacing between the inlet ports can rarely be attached to the supply pipes without encountering considerable difficulty and the frequent necessity of bending the supply pipe to make the installation.

In view of the above mentioned problem, numerous attempts have been made to facilitate the installation of these combination faucets but practically all have resulted in the use of adjustable links or fittings which materially lessen the attractiveness of the fixture.

The principal object of this invention is to provide a simple yet effective means for installing a combination faucet, which will compensate for the variation in spacing between the supply pipes and the inlet ports of the combination faucet.

Another object is the provision of a means which will serve the desired purpose without impairing the aesthetic proportions of the fixture by the addition of unsightly links or similar fittings of a cumbersome nature.

A further object is to provide a means for connecting the faucet to the supply pipes without the necessity of the pipes extending through the wall of the sink, which has heretofore been deemed essential to permit the attachment of the compensating links wholly within the sink so as to permit free movement or adjustment thereof.

Other objects and advantages will appear obvious from the following description of an illustrative embodiment of the present invention.

In the drawings:—

Figure 1:
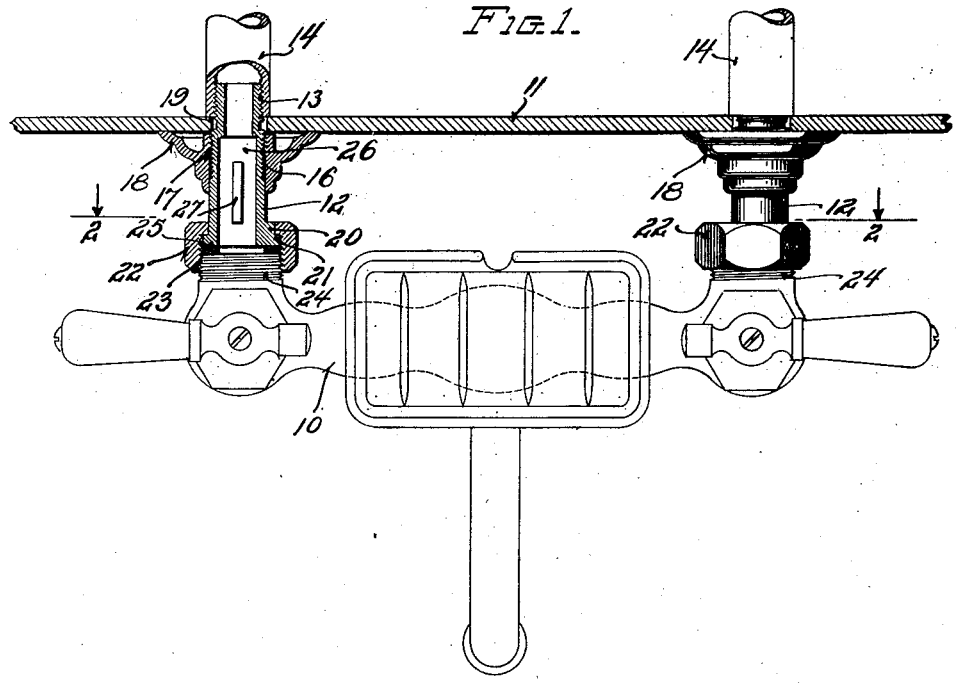
Figure 1 is a top plan view of a combination faucet installed in a sink by connecting means embodying the hereinafter described invention, one of which is shown in section.

For the purpose of illustrating the present invention a standard combination faucet 10 has been selected and attached to a sink 11 by means of a pair of connecting units which are illustrative embodiments of the present invention, each of which comprises a main body portion 12 which has an externally threaded end portion 13 adapted to be received in the threaded end of a water supply pipe 14. The body portion 12 is provided with a screw threaded portion 16 for engagement with a threaded aperture 17 in a flange 18 which serves a dual purpose, namely to act as a means for securing and retaining the water supply pipe 14 and as a cover plate for an aperture 19 in the wall 11 of the sink through which the connecting unit is applied to the supply pipe.

An enlarged head 20 forms the other end of the connecting unit and is eccentrically disposed on the shank 12; said head is provided with an annular shoulder 21 adapted to serve as a seat for a coupling 22 which is provided with internal threading 23 to cooperate with external threading 24 on the inlet port of the combination faucet 10, and compress a washer 25 to form a water tight union therebetween.

A passage 26 affords open communication between the supply pipe 14 and the combination faucet 10. A pair of lugs 27 are disposed within the passage 26 and serve as engaging means for a tool to facilitate the securing of the body portion to the water supply pipe and also permit angular movement to position the eccentric head to properly align the coupling with the inlet port of the combination faucet.

When the eccentric heads of the connecting units have been disposed at the proper angle so that the distance between their centers is eight inches, the flanges 18 may be drawn up tight to the wall 11 of the sink and thus anchor the connecting units and the supply pipes; after which it becomes necessary only to apply the combination faucet and tighten the two unions to mount the fixture onto the connecting units.

Figure 2:
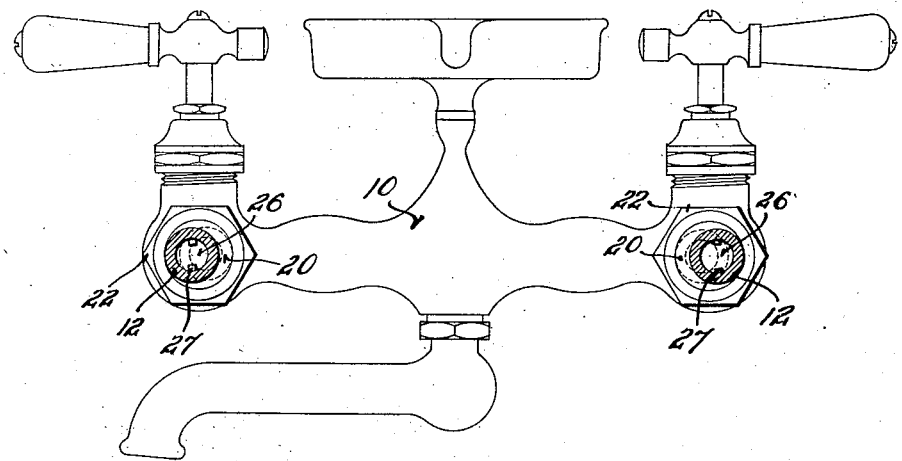
Fig. 2 is a rear elevational view of a combination faucet showing the connecting means in section as indicated by line 2—2 of Figure 1.

To mount a combination faucet by the means described in this invention is an extremely simple matter. The coupling and flange having been placed upon the main body portion of the connecting units, it requires only the insertion of a tool into the passage for engagement with the lugs to screw the unit into the supply pipe. When both of the connecting units are in place the compensation for the variance in spacing between the supply pipes and the inlet ports of the combination faucet may readily be cared for by slight rotation of the units to throw the eccentric heads away from the normal center in either direction thus decreasing the distance between centers of the eccentric heads as shown in the dotted line showing of Figure 2 or increasing the distance as indicated in the full line showing of the same figure until the standard eight inch spacing of the faucet has been reached. The flanges may then be screwed tight to the wall of the sink to anchor connecting units. The combination faucet may quickly be attached by means of the two couplings which form a neat and attactive union and do away with the necessity of cumbersome link mechanism to accomplish the same end.

While an embodiment of the invention has been described in considerable detail it will be understood that various changes may be made in the connecting units within the limits hereinafter set forth in the claims without departing from the spirit of the invention.

I claim:

1. Means for attaching a combination faucet having a pair of inlet ports to spaced supply pipes through an apertured wall, said means comprising units projectable through said wall, and eccentric portions on said units rotatable to compensate for variance in spacing between said ports and pipes.

2. Means for attaching a combination faucet having a pair of inlet ports to spaced supply pipes through an apertured wall, said means comprising a pair of connecting units projectable through said wall, eccentric heads integrally mounted on said connecting units, annular seats on said heads, couplings adapted to seat on said last named head, and means on said coupling for engagement with said combination faucet.

3. The combination with a combination faucet having a pair of spaced inlet ports for communication with a pair of spaced supply pipes through an apertured wall, of a pair of connecting units each comprising a shank portion engageable and concentric with one of said supply pipes through said apertured wall, an integral eccentric head mounted on said shank portion, a coupling means rotatably mounted on said eccentric head for engagement with said combination faucet, and said connecting unit being rotatable as a unit to vary the spacing between said heads to permit proper alignment of said couplings and said inlet ports of the combination faucet.

4. The combination with a combination faucet having spaced inlet ports for connection with spaced supply pipes through an apertured wall of a pair of angularly adjustable connecting units each comprising a shank portion for connection with one of said supply pipes, said portion adapted to extend through an aperture in said wall, an eccentric head integral with said shank portion, an annular seat on said head, a coupling adapted to seat on said last head, and means on said coupling for engagement with said combination faucet when said connecting unit is adjusted to properly align said eccentric head and said inlet port 5. Means for attaching a combination faucet having spaced inlet ports to spaced supply pipes through an apertured wall, said means comprising adjustable units for engagement with said supply pipes through the apertures in said wall, integral eccentric heads mounted on said units, rotatably mounted couplings on said heads, means on said couplings for engagement with said combination faucet.

6. Means for attaching a combination faucet having a pair of spaced inlet ports to spaced supply pipes through an apertured wall, said means comprising a pair of connecting units, said units having shank portions projectable through said wall apertures for engagement with said supply pipes, eccentric heads integral with said shank portions to rotate therewith, said heads carrying coupling means for engagement with said combination faucet.

In witness whereof, I hereunto subscribe my name this 26th day of January, 1927.

ROBERT C. ZANNOTH.